United States Patent [19]

Ahmad et al.

[11] Patent Number: 4,681,408
[45] Date of Patent: Jul. 21, 1987

[54] ADJUSTABLE MOUNT FOR LARGE MIRRORS

[75] Inventors: Anees Ahmad, Bethel; Richard Huse, Norwalk, both of Conn.

[73] Assignee: The Perkin-Elmer Corporation, Norwalk, Conn.

[21] Appl. No.: 856,881

[22] Filed: Apr. 28, 1986

[51] Int. Cl.⁴ .............................................. G02B 7/18
[52] U.S. Cl. .................... 350/609; 350/633; 350/486
[58] Field of Search .............. 350/611, 609, 607, 633, 350/486; 248/481, 484, 485

[56] References Cited

U.S. PATENT DOCUMENTS

| | | | |
|---|---|---|---|
| 3,015,990 | 1/1962 | Jonkers | 350/611 |
| 3,588,230 | 6/1971 | DeRieux | 350/486 |
| 3,588,232 | 6/1971 | Mostel | 350/633 |
| 4,268,123 | 5/1981 | Mesco | 350/609 |

FOREIGN PATENT DOCUMENTS 2903804 8/1980 Fed. Rep. of Germany ...... 350/607

Primary Examiner—Jon W. Henry
Attorney, Agent, or Firm—Thomas P. Murphy; Edwin T. Grimes; Paul A. Fattibene

[57] ABSTRACT

A mirror mounting apparatus which includes three tangent bars through which a mirror is mounted to a housing. One end of each of the tangent bars is mounted to the housing through a first spherical bearing while the second end of the tangent bar is mounted to the mirror through a second spherical bearing. The first spherical bearing has an axis perpendicular to the plane of the mirror. The second spherical bearing is oriented to have an axis perpendicular to both the axis of the first spherical bearing and to a line tangent to the point of attachment on the outer circumference of the mirror of the tangent bar.

6 Claims, 2 Drawing Figures

ADJUSTABLE MOUNT FOR LARGE MIRRORS

FIELD OF INVENTION

The present invention relates to tangent bar mounting systems and, more specifically, to such systems wherein large and heavy high-quality mirrors are to be mounted.

BACKGROUND OF THE INVENTION

Conventional mounting arrangements for large mirror call for flexured tangent bars to be mounted at spaced intervals on the periphery of the mirror. A typical such system has three tangent bars, tangently mounted, at 120° intervals about the periphery of the mirror. The tangent bars are in turn mounted to a cell or frame. Each of the tangent bars has one or more flexures integral thereto so as to allow the mirror to move out of its plane. Such movement is required to allow for axial and tilt adjustments of the mirror after assembly.

While movement of the mirror out of its plane is desirable, movement of the mirror in its plane is not. Accordingly, the mirror assembly, including tangent bars, is designed to have a very high resonance frequency. In this way, after the aforementioned adjustments are made, the mirror is held in a vibration-free state.

Conventional tangent bars, having flexures, have proved inappropriate for mounting large, heavy mirrors. This is so since the flexures required to achieve the desired high resonance are very stiff in bending. While they achieve the desired high resonance, these flexured tangent bars produce excessive distortion of the mirror surface when the axial location and tilt of the mirror are adjusted. Such distortions can also be introduced when the mirror and its associated housing, having different coefficients of thermal expansion, go through temperature excursions.

The present invention eliminates or ameliorates the foregoing disadvantages of the prior art by providing a tangent bar mount for large, heavy mirrors which has a high resonance frequency and introduces a minimum of distortion to the mirror when the axial location and tilt of the mirror is adjusted and when temperature excursions are experienced.

In addition, a weight compensation scheme is provided to eliminate surface figure distortions of the mirror due to the self-weight of the mirror.

BRIEF DESCRIPTION OF THE INVENTION

In order to achieve the desired results the present invention provides a new and improved tangent bar mounting system.

A mirror is mounted to a housing through three tangent bars. Each of the tangent bars is mounted to the housing through a first spherical bearing while the second end of the tangent bar is mounted to the mirror through a second spherical bearing. The first spherical bearing has an axis perpendicular to the plane of the mirror. The second spherical bearing is oriented to have an axis perpendicular to both the axis of the first spherical bearing and to a line tangent to the point of attachment of the tangent bar.

Also provided are a plurality of springs placed equidistantly about the circumference of the mirror. The springs serve to support the weight of the mirror so as to eliminate surface figure distortions due to the weight of the mirror itself.

Three micrometers, acting on each of the three tangent bars, are used to align the mirror with the optical system of which it is a part.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which the disclosure is based may readily be utilized as a basis for designing other structures for carrying out the several purposes of the invention. It is important, therefore, that the claims be regarded as including such equivalent structures as do not depart from the spirit and scope of the invention.

Specific embodiments of the invention have been chosen for purposes of illustration and description, and are shown in the accompanying drawing, forming a part of the specification.

DETAILED DESCRIPTION OF A PREFERRED EMBODIMENT

Figure 1:
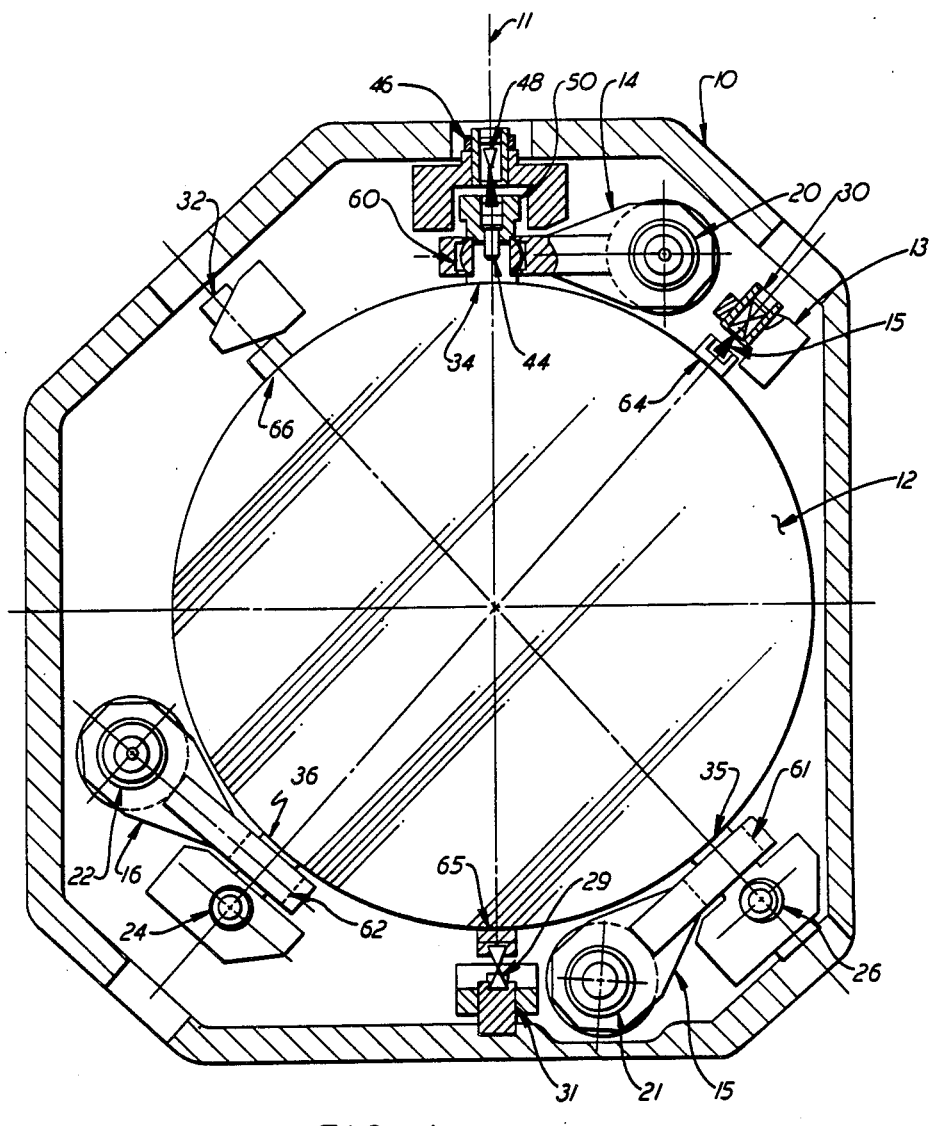
FIG. 1 shows a front view of a mirror mounted in an adjustable mount in accordance with the present invention.

FIG. 1 is a front view of an apparatus in accordance with the present invention showing a mirror 12 mounted to a housing 10 through tangent bars 14, 15 and 16. The housing 10 may be of any suitably stiff material, such as aluminum.

Each tangent bar 14–16 is mounted to the housing 10 through spherical bearings 20–22, respectively. The axes of spherical bearings 20–22 are perpendicular to the plane of the mirror 12. The mirror 12 is mounted to the tangent bars 14–16 through spherical bearings 60–62. The spherical bearings 60–62 are directly mounted to the mirror 12 by buttons 34–36, respectively, which are made of a low thermal expansion material such as Invar.

The axes of spherical bearings 60–62 are perpendicular to the outside diameter of the mirror 12 at the point of tangency of tangent bars 14–16, respectively and perpendicular to the axes of spherical bearings 20–22, respectively. This relationship ensures that the mirror 1 exhibits very good in-plane resonance characteristics; that is, the mounting arrangement hereinabove described is very stiff in the plane of the mirror 12. The relative orientation of the spherical bearings 20–22 and 60–62 ensures that there is little or no movement of the mirror relative to the housing 10 in a direction tangent to the mirror 12 at the mounting point of connection of the tangent bars 14–16, respectively. Increasing the mass of the tangent bars 14–16 further decreases this relative movement.

The relative orientation of spherical bearings 20–22 to spherical bearings 60–62 ensures that movement of the mirror 12 relative to the housing 10 out of the plane of the mirror 12 is unhindered. In this way adjustment of the mirror 12 can be accomplished without introducing unwanted stresses to the mirror 12 through tangent bars 14–16 and buttons 34–36, respectively. The manner in which these movements are made will be described hereinbelow in reference to FIG. 2.

It can be appreciated that the above-described apparatus is useful in compensating for differences in thermal coefficients of expansion between the housing 10 and the mirror 12. Thus, if the housing 10 were to expand at a faster rate than the mirror 12 the spherical bearings 20–22 and 60–62 associated with tangent bars 14–16, respectively, will allow the tangent bar to rotate freely relative to both the mirror 12 and the housing 10. In this manner no mechanical stresses are introduced in the mirror 12 during temperature excursions and the mirror 12 is returned to its same spatial relationship to the housing 10 following such a temperature excursion.

Distortions of the surface of the mirror 12 due to its self weight are eliminated by a spring suspension system. The cut-away view of the assembly of tangent bar 14 shows the manner in which a spring 48 can be mounted through the tangent bar 14 to suspend the mirror 12.

A screw 44 attaches an insert 50 to the button 34. One end of the spring 48 is attached to the insert 50 while the other end of the spring 48 is attached to an adjustment mechanism 46. The adjustment mechanism 46 is attached to the housing 10 and allows the tension of the spring 48 to be adjusted. In this manner the mirror 12 is suspended from the housing 10 through an adjustable spring 48. Each of the tangent bars 15 and 16 has associated therewith a spring suspension system equivalent to that described hereinabove in reference to tangent bar 14.

In addition to the spring suspension systems associated with tangent bars 14–16 there are free-standing spring suspension systems 30–32 attached to the mirror through buttons 64–66, respectively. The buttons are made of a material having a low coefficient of expansion, such as Invar. The cut-away view of the free-standing spring suspension system 30 is representative of three of such systems 30–32. A spring 15 is attached at one end thereof to the button 64 and at the other end thereof to an adjustment mechanism 13. The adjustment mechanism 13 is attached to the housing and allows the tension of the spring 15 to be adjusted.

It can thus be seen that the mirror is suspended by free-standing spring suspension systems 30–32 and by the spring suspension system acting through tangent bar 14–16 each located equidistantly about the circumference of the mirror 12. The tension on each of the springs is adjusted in the manner hereinabove described so that each is bearing an equal proportion of the weight of the mirror 12 to minimize mirror distortion.

While the mirror suspension system has been described as having six springs it can be understood that such a system may have more or less than that amount.

Figure 2:
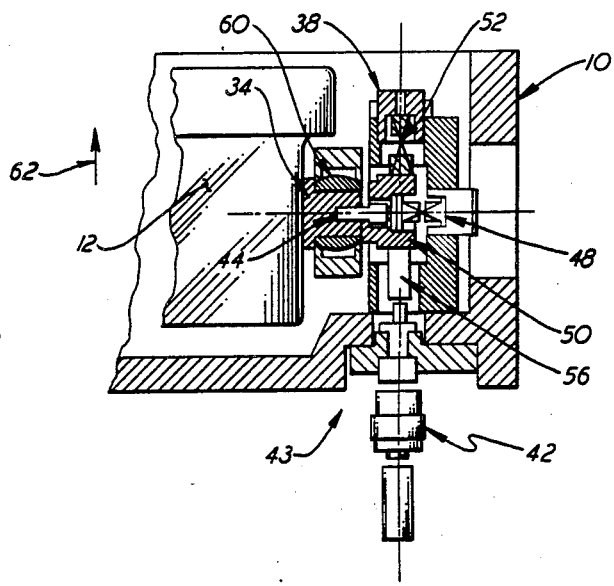
FIG. 2 is a cutaway view of one of the tangent bar mounts of FIG. 1 showing a mirror adjustment micrometer.

FIG. 2 is a side sectional view of tangent bar 14 of FIG. 1 taken perpendicular to a plane through axis 11 and perpendicular to the plane of the mirror 12. Shown is an adjustment apparatus 43 useful in moving the mirror 12 out of its plane. Thus a micrometer 42 is adjustable to cause an extension member 56 to move against the insert 50. As described hereinabove the insert 50 is attached to the button 34 through the screws 44. A spring 52 maintains a force against the insert 50, hence against the extension member 56 and micrometer 42, to provide positive backlash-free movement. Thus when the micrometer 42 is manipulated to move the extension member 56 toward the insert 50, the insert 50, thus the mirror 12, moves in the direction of arrow 62. If the movement of the micrometer is reversed the direction of movement of the mirror is likewise reversed.

These movements are accomplished while introducing a minimum of stress to mirror 12 since the spherical bearings 20 and 60 allow the tangent bar 14 to rotate freely relative to the mirror 12 and to the housing 10.

It can thus be seen that adjustment apparati, similar to that described hereinabove, acting through tangent bars 14–16 can move the mirror 12 in and out of its plane and cause the mirror 12 to tilt in any direction desired about its vertex.

There has thus been described an adjustable mount for large mirrors which is unaffected by temperature excursions, has a high resonance frequency and introduces a minimum of distortion to the mirror. when the axial location and tilt of the mirror is adjusted. Distortion to the mirror is further reduced by providing a weight compensation scheme to compensate for the self-weight of the mirror.

Other modifications of the present invention are possible in light of the above-description which should not be deemed as limiting the invention beyond those limitations contained in the claims which follow.

What is claimed is:

1. A mirror mounting apparatus comprising:
   a mirror;
   a housing;
   three individual tangent bars having a first end and a second end;
   each of said three individual tangent bars having the first end thereof rotatably mounted to said housing through a first spherical bearing and the second end thereof rotatably mounted to said mirror through a second spherical bearing;
   the first spherical bearing having an axis perpendicular to the plane of said mirror; and
   the second spherical bearing having an axis perpendicular to both the axis of said first spherical bearing and to a line tangent to the point of contact on said outer circumference of said mirror of said tangent bar.

2. A mirror mounting apparatus as claimed in claim 1 wherein said second spherical bearing is rotatably mounted to said mirror through a button, said button being of a material having a low coefficient of thermal expansion.

3. A mirror mounting apparatus as claimed in claim 1 which further comprises:
   adjustment means to move said mirror along its optical axis or to tilt said mirror about its optical axis.

4. A mirror mounting apparatus as claimed in claim 3 wherein said adjustment means comprises:
   micrometer means affixed to said housing operable in cooperation with the second end of said tangent bar to move said mirror out of its plane.

5. A mirror mounting apparatus as claim in claim 1 which further comprises suspension means for preventing distortions of said mirror due to the weight of said mirror.

6. A mirror mounting apparatus as claimed in claim 5 wherein said suspension means comprises:
   a plurality of springs, spaced about the circumference of said mirror, having a first end and a second end;
   the first end of said plurality of springs being mounted to said housing through tension adjusting means; and
   the second end of said plurality of springs being mounted to said mirror.

* * * * *